United States Patent [19]

Hertel

[11] 4,087,192

[45] May 2, 1978

[54] CUTTING TOOL BIT

[76] Inventor: Karl Hertel, Oedenberger Strasse 29, 8500 Nuremberg, Germany

[21] Appl. No.: 730,521

[22] Filed: Oct. 7, 1976

[30] Foreign Application Priority Data

Oct. 8, 1975 Germany .............................. 2544991

[51] Int. Cl.² .............................................. B26D 1/00
[52] U.S. Cl. .................................................... 407/114
[58] Field of Search ................... 29/95 R, 95 A, 95 B, 29/95 C, 96

[56] References Cited

U.S. PATENT DOCUMENTS

| 3,381,349 | 5/1968 | Newcomer | 29/95 R |
| 3,395,434 | 8/1968 | Wirfelt | 29/95 R |
| 3,399,442 | 9/1968 | Jones et al. | 29/95 R |
| 3,947,937 | 4/1976 | Hertel | 29/95 R |

FOREIGN PATENT DOCUMENTS

| 2,252,349 | 5/1973 | Germany. |
| 2,252,350 | 5/1973 | Germany. |

Primary Examiner—Harrison L. Hinson
Attorney, Agent, or Firm—Spencer & Kaye

[57] ABSTRACT

A cutting tool bit has at least one cutting edge formed by an abutment edge between an end face and a side face; a cutting face adjoining the cutting edge and more than two chip breaker steps bounded by step edges and extending approximately parallel to the length dimension of the cutting edge and ascending from the cutting face towards the bit center. The chip breaker steps are arranged in a terraced manner and each step edge has a wavy shape along its length.

24 Claims, 23 Drawing Figures

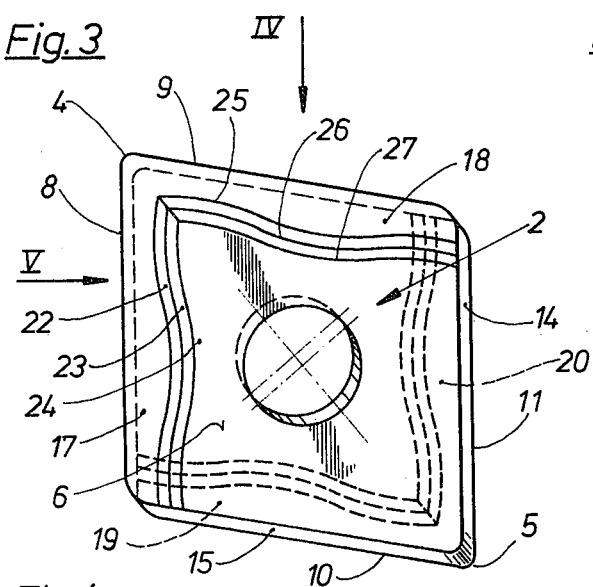
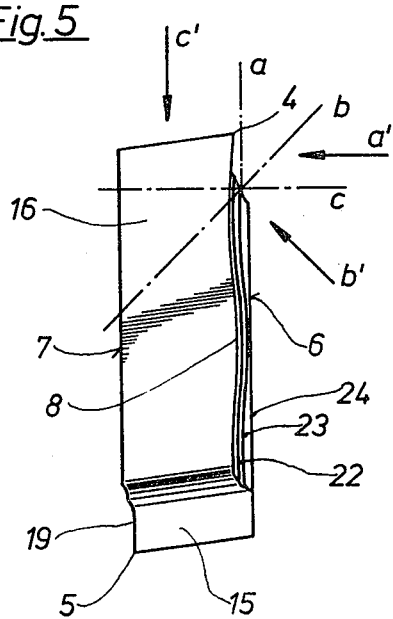
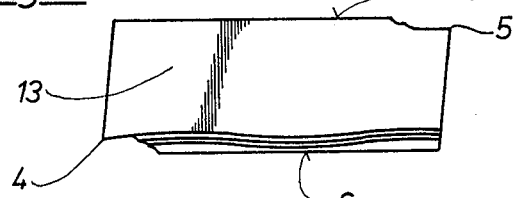
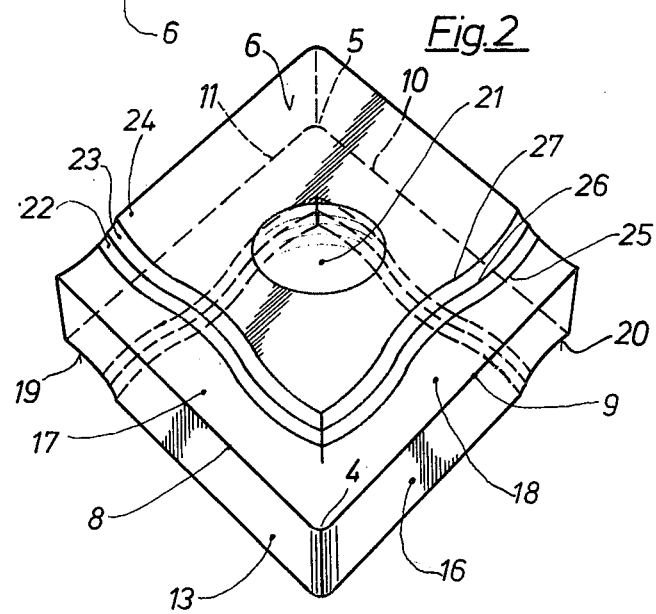

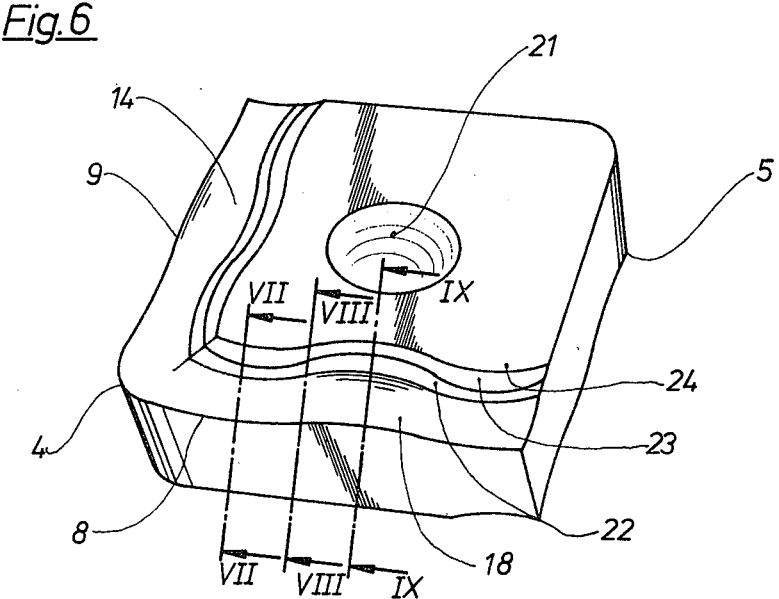
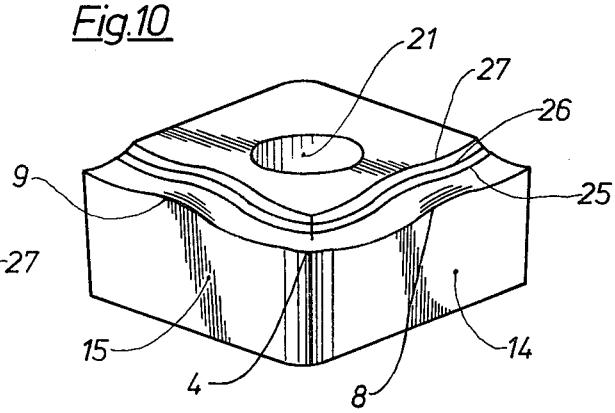
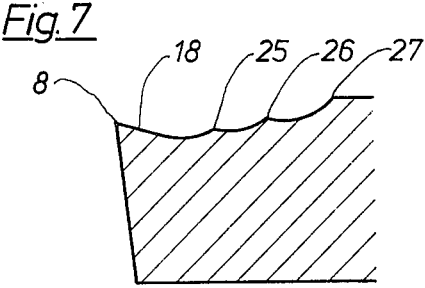
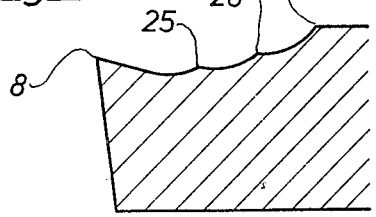
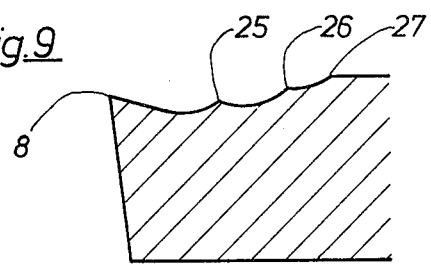

CUTTING TOOL BIT

BACKGROUND OF THE INVENTION

The invention relates to a cutting insert (cutting tool bit) for machining preferably metallic workpieces, the insert including at least one cutting edge formed by an abutment edge between an end face and a side face an a plurality of chip breaker steps extending approximately in the longitudinal direction of the cutting edge in superposed arrangement ascending from the cutting face adjacent the cutting edge in the direction toward the center of the cutting insert.

It is known to form cutting inserts of the above-mentioned type which have two chip breaker steps. In, such an arrangement the first chip breaker step has a constant distance from the cutting edge or a constant width and depth, respectively, relative to the cutting edge, while the distance from the cutting edge or the width and depth, respectively, of the second chip breaker step may vary with the position or depth of the cutting edge. Such a structure is disclosed in German Laid-Open Application (Offenlegungsschrift) No. 2,252,350.

SUMMARY OF THE INVENTION

It is the object of the invention to even further improve a cutting insert of the above-mentioned type and to provide measures so that an optimum number of chip breaking pressures which act in different directions and vary over the width of the chip can act on the chip for deforming the same to such an extent in transverse directions that it breaks at optimum speed and in short lengths. This is of particular advantage for large chip cross sections.

This object and others to become apparent as the specification progresses, are accomplished by the invention, according to which, briefly stated, the cutting tool bit has at least one cutting edge formed by an abutment edge between and end face and a side face; a cutting face adjoining the cutting edge and more than two chip breaker steps bounded by step edges and extending approximately parallel to the length dimension of the cutting edge and ascending from the cutting face towards the bit center. The chip breaker steps are arranged in a terraced manner and each step edge has a wavy shape along its length.

The ripple design of the step edges of the chip breaker steps may lie in different planes depending on the respective requirements of use.

The shape and mutual association of the ripples may vary depending on their amplitude, wavelength and mutual spacing and their mutual phase shifts.

The subject matter of the invention will be explained in detail with the aid of embodiments illustrated in the drawing figures. The embodiments are based on a reversible cutting element having cutting edges associated with its two end faces to be used in particular for copying purposes.

BRIEF DESCRIPTION OF THE DRAWINGS

FIG. 2 is a perspective representation of a reversible cutting element with chip breaker steps according to the invention;

FIG. 3 is a top view of the reversible cutting element analogous to FIG. 2;

FIG. 4 is a side elevational view according to arrow IV of FIG. 3;

FIG. 5 is a side elevational view according to arrow V of FIG. 3;

FIG. 6 is a perspective representation of a modified embodiment of a reversible cutting element according to the invention;

FIG. 7 is a sectional view along the line VII—VII of FIG. 6;

FIG. 8 is a sectional view along the line VIII—VIII of FIG. 6;

FIG. 9 is a sectional view along the line IX—IX od FIG. 6;

FIG. 10 is a perspective view of a further embodiment of the invention;

DESCRIPTION OF THE PREFERRED EMBODIMENTS

Figure 1:
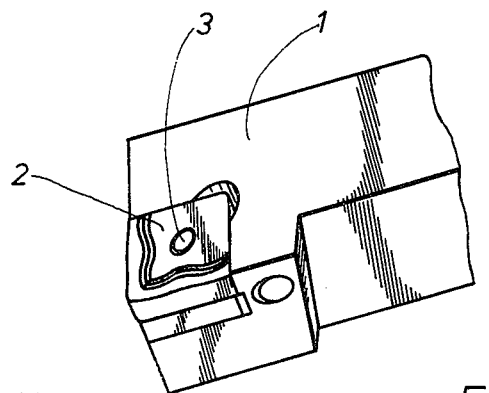
FIG. 1 is a perspective schematic representation of a clamping tool holder with a reversible cutting element (tool bit) provided with chip breaker steps according to the invention.

Turning now to FIG. 1, at the front end of the clamping tool holder 1, the cutting insert (tool bit) 2 is fastened within a holder recess. The cutting insert 2 is an apertured reversible plate having a hole which passes centrically through the cutting insert for engagement of a clamping bolt 3 which tensions the cutting insert 2 in the direction toward the contact surfaces of the holder recess. This manner of clamping is not part of the invention so that it need not be discussed in detail.

Also referring to FIGS. 2, 3, 4 and 5, the cutting insert 2 has two cutting points 4, 5 each associated with one of the two end faces 6, 7. The cutting edges 8, 9 or 10, 11, respectively, forming the respective cutting points 4, 5 are each formed by an abutment edge between end faces 6, 7 and one of the side faces 13, 14 15, 16. The two cutting points 4, 5 lie at diametrally opposite corners of the cutting insert 2.

Figure 5A:
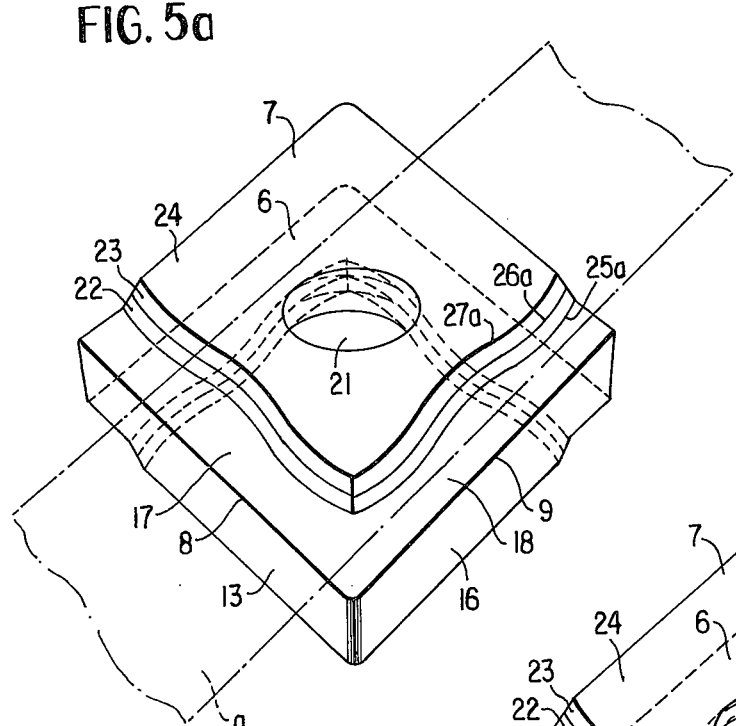
FIGS. 5a, 5b and 5c are perspective views of different embodiments of the reversible cutting element according to the invention.
Figure 5B:
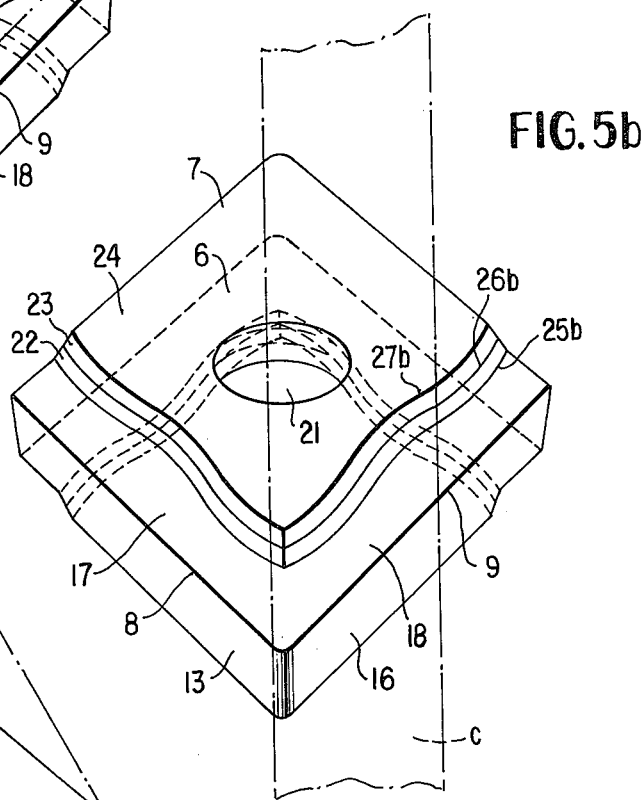
Figure 5C:
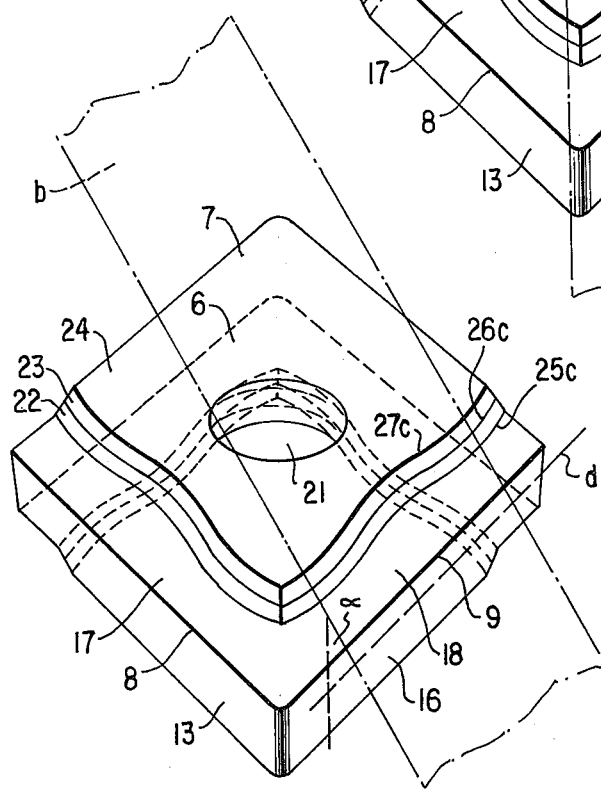

Chip breaker steps 22, 23, 24 are arranged in a superposed arrangement ascending from cutting face 17, 18 or 19, 20, respectively, adjacent cutting edges 8, 9 or 10, 11, respectively, in the direction toward the center of the cutting insert 21, the upper chip breaker step 24 being formed by the end faces 6, 7, respectively of the cutting insert. The three chip breaker steps 22, 23, 24 extend along the cutting edges 8, 9 or 10, 11, respectively, in the manner of a terrace. Seen over its length, each step edge 25, 26, 27 has a wavy shape in itself. Advantageously the ripples (waves) which form each step edge have the shape of a harmonic wave, e.g. a sinusoidal wave, whose length is advantageously greater than one whole wavelength (wave peak and wave trough). The ripples of a step edge 25, 26, 27 may be selected so that they lie in a plane $a$ parallel to end faces 6, 7 of cutting insert 2. The ripples may also be selected so that they lie in a plane $c$ which is perpendicular to end faces 6, 7. Or they may lie in an imaginary plane $b$ which is inclined about an axis parallel. to the clearance surface. Thus, in FIG. 5a there is shown, in dash-dot lines, an imaginary plane $a$ which is parallel to the end faces 6, 7 and in which lies the wavy step edge 25a. The step edges 26a and 27a may lie in further planes (not shown) which are spaced from one another and which are parallel to the plane a. In FIG. 5b there is shown, in dash-dot lines, an imaginary plane c which is perpendicular to the end faces 6, 7 and in which lies, along one side of the tool bit, the wavy step edge 25b. The step edges 26b and 27b may lie in further planes (not shown) which are also perpendicular to the end faces 6, 7. In FIG. 5c there is shown, in dash-dot lines, an imaginary plane b in which the wavy step edge 25c lies. As noted in substance earlier, the plane b contains an axis d which is parallel, for example, to the clearance surface 16 and further, the plane b extends obliquely with an inclination a, with respect to the clearance surface 16. The step edges 26c and 27c may lie in further planes (not shown) positioned with the same characteristics as plane b.

Generally the cutting edges 8, 9 or 10, 11, respectively, also have a wavy shape in themselves (FIGS. 5, 6, 10); however, the side faces 13, 14 or 15, 16, respectively, which form the clearance surface of the cutting edges are planar. The cutting faces 17, 18 or 19, 20, respectively, are then also rippled in themselves. The same may be the case for the surfaces of the chip breaker steps. FIGS. 7, 8 and 9 are cross-sectional illustrations taken at spaced locations along the length of the chip breaker grooves 22, 23 and 24 of FIG. 6. It is, however, also possible to make the cutting edges 8, 9 or 10, 11, respectively, linear (FIG. 2), so that a rake angle is assured which remains uniform over the entire length of a cutting edge 8, 9 or 10, 11, respectively.

Figure 11:
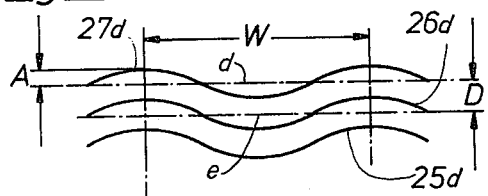
FIGS. 11-20 are schematic top views of various ripple designs of the chip breaker steps in the direction of the arrows $a'$, $b'$ or $c'$ normal to the imaginary planes $a$, $b$ and $c$ of FIG. 5.
Figure 12:
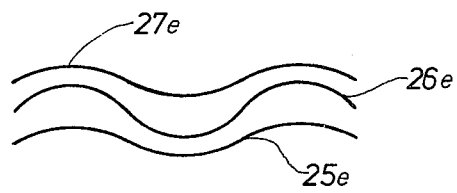
Figure 13:
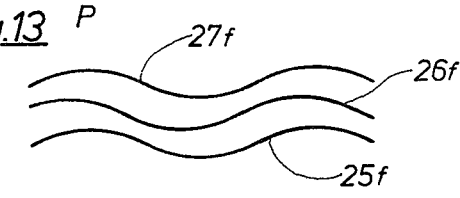
Figure 14:
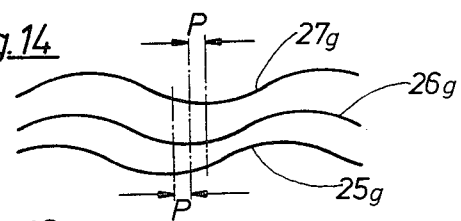
Figure 15:
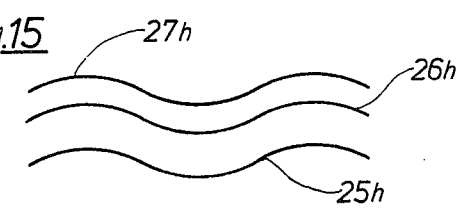
Figure 16:
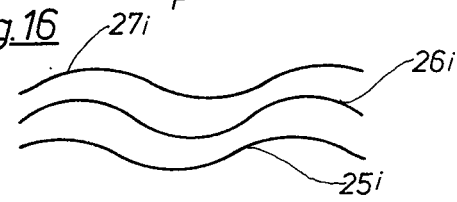
Figure 17:
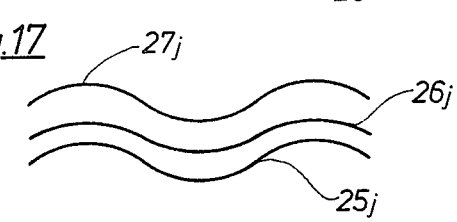
Figure 18:
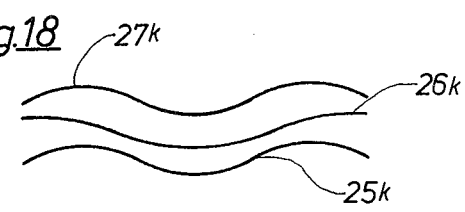
Figure 19:
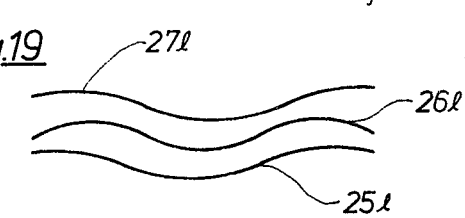
Figure 20:
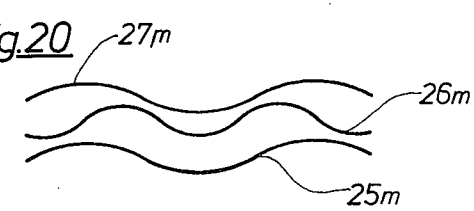

Turning now to FIGS. 11 through 20, the geometrical relationships among the ripples (step edges) 25(d-m), 26(d-m) and 27(d-m) in the various tool bit structures may be as follows:

FIG. 11: equal amplitudes A, equal wavelengths W, equal distances D of the ripples 25d, 26d and 27d from one another, no phase shift P between ripples. It is noted that the dash-dot lines d and e also represent the axis of propagation of the wave lines constituting the ripples 26d and 27d, respectively;

FIG. 12: unequal amplitudes A, equal wavelengths W, equal distances D between ripples 25e, 26e and 27e, no phase shift P;

FIG. 13: equal amplitudes A of the ripples 25f, 26f and 27f, equal wavelengths W, equal distances D between ripples, with a phase shift P between ripples;

FIG. 14: equal amplitudes A, equal wavelengths W, unequal distances D between ripples 25d, 26g and 27g, with a phase shift P;

FIG. 15: equal amplitudes A, equal wavelengths W, unequal distances D between ripples 15h, 26h and 27h, without phase shift P between ripples;

FIG. 16: unequal amplitudes A, equal wavelengths W, equal distances D between ripples 25i, 26i and 27i, with a phase shift P between ripples;

FIG. 17: unequal amplitudes A, equal wavelengths W, unequal distances D between ripples 25h, 26j and 27j, without phase shift P;

FIG. 18: equal amplitudes A, unequal wavelengths W, equal distances D between ripples 25k, 26k and 27k, without phase shift;

FIG. 19: equal amplitudes A of the ripples 25l, 26l and 27l, unequal wavelengths W, equal distances D between ripples with phase shift P between ripples; and FIG. 20: unequal amplitudes A, unequal wavelengths W, unequal distances D between ripples 25m, 26m and 27m, without phase shift P.

It will be understood that the above description of the present invention is susceptible to various modifications, changes and adaptations, and the same are intended to be comprehended within the meaning and range of equivalents of the appended claims.

What is claimed is:

1. In a cutting tool bit having a center, end faces and side faces; at least one cutting edge formed by an abutment edge between an end face and a side face; a cutting face adjoining the cutting edge; and a plurality of chip breaker steps bounded by step edges and having a length dimension extending approximately parallel to the length dimension of the cutting edge and ascending from the cutting face towards the center; the improvement wherein the number of said chip breaker steps is more than two; said chip breaker steps being arranged in a terraced manner; and each said step edge having a wavy course of harmonic shape.

2. A cutting tool bit as defined in claim 1, wherein each step edge lies in a plane oriented parallel to one of said end faces.

3. A cutting tool bit as defined in claim 1, wherein each step edge lies in a plane oriented perpendicular to one of said end faces.

4. A cutting tool bit as defined in claim 1, wherein each step edge lies in a plane oriented obliquely about an axis extending parallel to a free cutting face of the tool bit.

5. A cutting tool bit as defined in claim 1, wherein the waves constituting the step edges have, compared to one another, the same amplitudes and the same wavelengths; the spacing between the different wavy step edges being the same; and adjoining wavy step edges being arranged in phase with one another.

6. A cutting tool bit as defined in claim 1, wherein the waves constituting the groove edges have, compared to one another, the same amplitudes and the same wavelengths; the spacing between the different wavy groove edges being the same; and adjoining wavy groove edges being arranged with a phase shift with respect to one another.

7. A cutting tool bit as defined in claim 1, wherein the waves constituting the step edges have, compared to one another, the same amplitudes and the same wavelengths; the spacing between the different wavy step edges being different; and adjoining wavy step edges being arranged with a phase shift with respect to one another.

8. A cutting tool bit as defined in claim 1, wherein the waves constituting the step edges have, compared to one another, the same amplitudes and the same wavelengths; the spacing between the different wavy step edges being different; and adjoining wavy step edges being arranged in phase with respect to one another.

9. A cutting tool bit as defined in claim 1, wherein the waves constituting the step edges have, compared to one another, the same amplitudes and different wavelengths; the spacing between the different wavy step edges being the same; and adjoining wavy step edges being arranged in phase with respect to one another.

10. A cutting tool bit as defined in claim 1, wherein the waves constituting the step edges have, compared to one another, the same amplitudes and different wavelengths; the spacing between the different wavy step edges being different; and adjoining wavy step edges being arranged in phase with respect to one another.

11. A cutting tool bit as defined in claim 1, wherein the waves constituting the step edges have, compared to one another, the same amplitudes and different wavelengths; the spacing between the different wavy step edges being the same; and adjoining wavy step edges being arranged with a phase shift with respect to one another.

12. A cutting tool bit as defined in claim 1, wherein the waves constituting the step edges have, compared to one another, the same amplitudes and different wavelengths; the spacing between the different wavy step edges being different; and adjoining wavy step edges being arranged with a phase shift with respect to one another.

13. A cutting tool bit as defined in claim 1, wherein the waves constituting the step edges have, compared to one another, different amplitudes and the same wavelengths; the spacing between the different wavy step edges being the same; and adjoining wavy step edges being arranged in phase with respect to one another.

14. A cutting tool bit as defined in claim 1, wherein the waves constituting the step edges have, compared to one another, the same amplitudes and the same wavelengths; the spacing between the different wavy step edges being the same; and adjoining wavy step edges being arranged with a phase shift with respect to one another.

15. A cutting tool bit as defined in claim 1, wherein the waves constituting the step edges have, compared to one another, different amplitudes and the same wavelengths; the spacing between the different wavy step edges being different; and adjoining wavy step edges being arranged with a phase shift with respect to one another.

16. A cutting tool bit as defined in claim 1, wherein the waves constituting the step edges have, compared to one another, different amplitudes and the same wavelengths; the spacing between the different wavy step edges being different; and adjoining wavy step edges being arranged in phase with respect to one another.

17. A cutting tool bit as defined in claim 1, wherein the waves constituting the step edges have, compared to one another, different amplitudes and different wavelengths; the spacing between the different wavy step edges being the same; and adjoining wavy step edges being arranged with a phase shift with respect to one another.

18. A cutting tool bit as defined in claim 1, wherein the waves constituting the step edges have, compared to one another, different amplitudes and different wavelengths; the spacing between the different wavy step edges being different; and adjoining wavy step edges being arranged with a phase shift with respect to one another.

19. A cutting tool bit as defined in claim 1, wherein the waves constituting the step edges have, compared to one another, different amplitudes and different wavelengths; the spacing between the different wavy step edges being the same; and adjoining wavy step edges being arranged in phase with respect to one another.

20. A cutting tool bit as defined in claim 1, wherein the waves constituting the step edges have, compared to one another, different amplitudes and different wavelengths; the spacing between the different wavy step edges being different; and adjoining wavy step edges being arranged in phase with respect to one another.

21. A cutting tool bit as defined in claim 1, wherein said cutting edge is linear.

22. A cutting tool bit as defined in claim 1, wherein said cutting edge has a wavy course oscillating about an axis which extends parallel to one of said end faces.

23. A cutting tool bit as defined in claim 1, wherein there are provided a plurality of cutting edges; every edge formed between a side face and an end face of said cutting tool bit being a cutting edge.

24. A cutting tool bit as defined in claim 1, wherein said chip breaker steps have surfaces of wavy course.

* * * * *